UNITED STATES PATENT OFFICE.

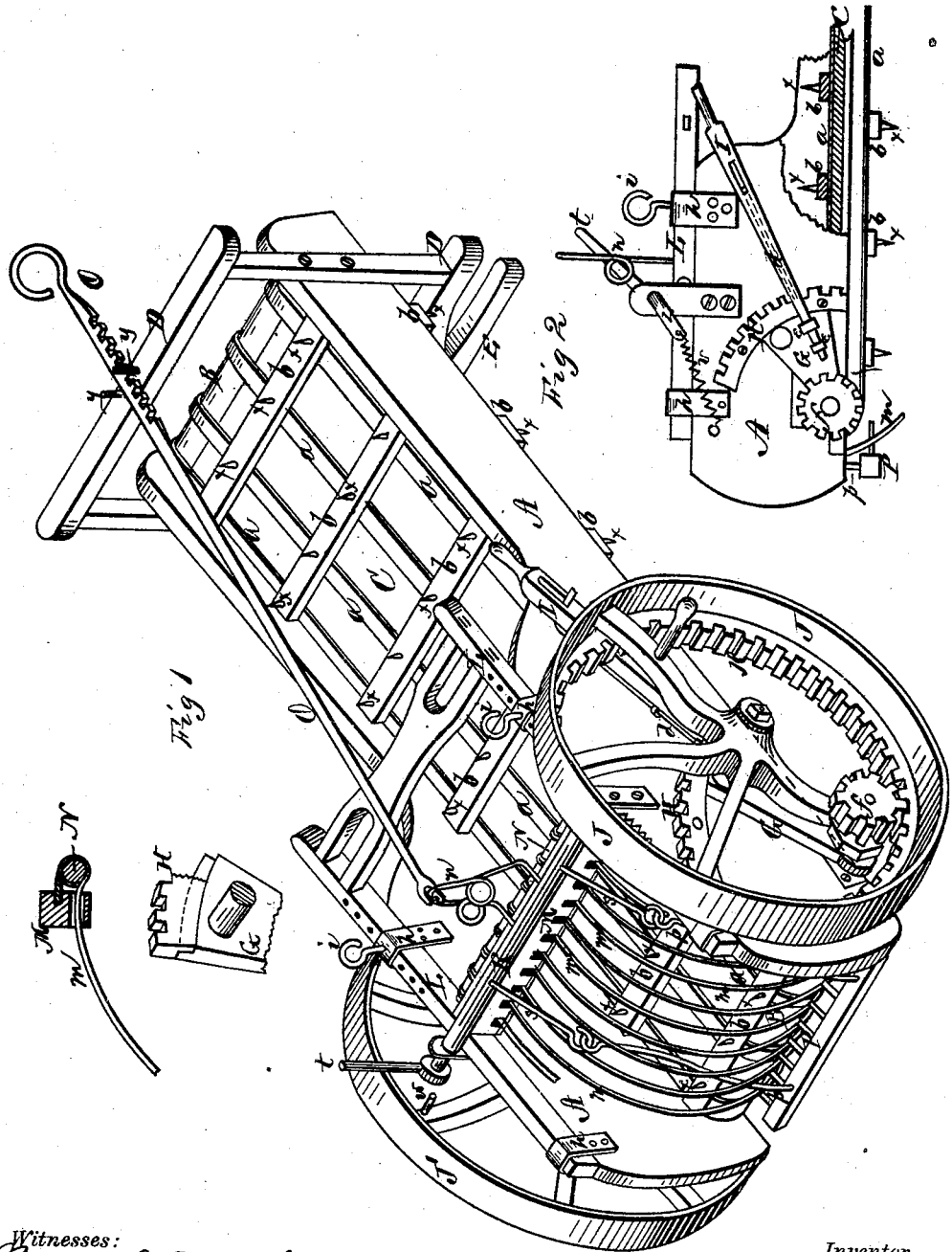

ANTHONY GARVER, OF LIME SPRING STATION, IOWA, ASSIGNOR TO HIMSELF AND C. C. HEWITT, OF SAME PLACE.

IMPROVEMENT IN HAY-LOADERS.

Specification forming part of Letters Patent No. 146,896, dated January 27, 1874; application filed June 14, 1873.

*To all whom it may concern:*

Be it known that I, ANTHONY GARVER, of Lime Spring Station, in the county of Howard and in the State of Iowa, have invented certain new and useful Improvements in Hay and Grain Rake and Loader; and do hereby declare that the following is a full, clear, and exact description thereof, reference being had to the accompanying drawings, and to the letters of reference marked thereon, making a part of this specification.

The nature of my invention consists in the construction and arrangement of a hay and grain rake and loader, as will be hereinafter more fully set forth.

In order to enable others skilled in the art to which my invention appertains to make and use the same, I will now proceed to describe its construction and operation, referring to the annexed drawing, in which—

Figure 1 is a perspective view of my machine, and Fig. 2 is a side view of the rear part of the same with the driving-wheel removed.

A represents the carrier-frame, having a roller, B, at each end, and a bottom, C, extending the whole length of the frame between said rollers. Around the rollers B B pass an endless carrier, composed of belts $a$ $a$, of rubber or other suitable material, with slats $b$ $b$ across the belts at suitable intervals, and teeth or tines $x$ $x$ attached to the slats. The front end of the main frame A is fastened in a frame, D, with bolster E underneath, by which the machine is attached to the top of a rack made for receiving the hay or grain as it is elevated by the machine. The axle or journals of the roller B at the lower or rear end of the carrier-frame A extend beyond the sides of the same, and have each an arm, G, placed loosely upon it. This arm extends forward along the side of the frame A, and its outer end is rabbeted, and passes under the correspondingly rabbeted inner edge of a segment-bar, H, attached to the side of the frame A. Upon or near the outer end of each arm G is an outward-projecting spindle to receive the driving-wheels. On the outer side of each arm G are sockets or staples $e$ $e$, in which the end of a lever, I, is inserted, and on this lever is arranged a spring pawl or stop, $d$, to engage with cogs or teeth formed on the outer edge of the segment-bar H. By this means the carrier-frame A may be raised and lowered at will, so as to suit the condition of the hay or grain, whether light or heavy. J and J′ represent the two driving-wheels, placed upon the spindles on the arms G G. The wheel J is provided with an internally-cogged ring, K, which gears with a pinion, $f$, upon the axle of the lower roller B, and whereby the carrier obtains its motion. On the upper edges of the side pieces of the carrier-frame A is placed a frame, L, sliding in guides or boxes $h$ $h$, and held at any desired point by means of pins $i$ $i$, as shown. In the frame L is pivoted a cross-bar, M, which is provided with a series of slots or cuts in its lower edge, and through each of these passes a tooth, $m$, made of wire or other suitable material, bent as shown, and the front end of each tooth is bent around a rod, N, twice, and the extreme end inserted in the front side of the bar M. To the bar or rake-head M is attached a spring-arm, $n$, from which a lever, O, extends forward and upward over the top of the frame D. This lever O is notched and placed between pins $y$ $y$ on the frame D, so that by means of said lever, the rake may be raised or lowered at will, and held at any desired elevation to suit the ground. The spring-arm $n$ between the end of the lever and the rake-head forms a flexible connection, and will prevent breakage of the parts in case of a sudden jar of the machine. By adjusting the frame L backward or forward, the space between the gathering-rake M $m$ and the endless carrier is opened or closed at will, so as to gather light and heavy grain or hay equally well. P represents another rake, the teeth of which work between the teeth $m$ $m$. This rake P is suspended by means of two rods, $p$ $p$, from two arms, $s$ $s$, which extend from a shaft, R. The shaft R is placed in suitable bearings extending from the carrier-frame A above the sliding frame L, and in rear of the rake-head M. Upon one end of the shaft R is an arm, $t$, which is operated upon twice during each revolution of the wheel $J'$ by means of pins $w$, attached to the inner side of said wheel. The rake P is by this means at intervals raised up a certain distance to cause the hay or grain in the gathering-rake to be caught by the endless carrier, and the rake P is thrown back by means of a spring, $v$, operating on an arm or crank, $z$, on the other end of the shaft R.

This machine saves the raking, cocking, and pitching of the hay or grain, and will work on uneven or rough ground; or, in other words, it will work any place where a reaper or mower will cut hay or grain.

Having thus fully described my invention, what I claim as new, and desire to secure by Letters Patent, is—

1. The combination of the rake M $m$ N and sliding frame L, adjusted upon the carrier-frame A, substantially as and for the purposes herein set forth.

2. The combination of the roller R with arms $s\ s$ and rake P, the arm $t$, spring $v$, and pins $w\ w$ on the wheel $J'$, all substantially as and for the purposes herein set forth.

In testimony that I claim the foregoing I have hereunto set my hand this 15th day of May, 1873.

ANTHONY GARVER.

Witnesses:
CHAS. P. WORK,
JOHN M. DAVIES.